Oct. 18, 1966  L. W. FLECKENSTEIN ET AL  3,279,749
DIAPHRAGM VALVE
Filed Dec. 23, 1963  4 Sheets-Sheet 1
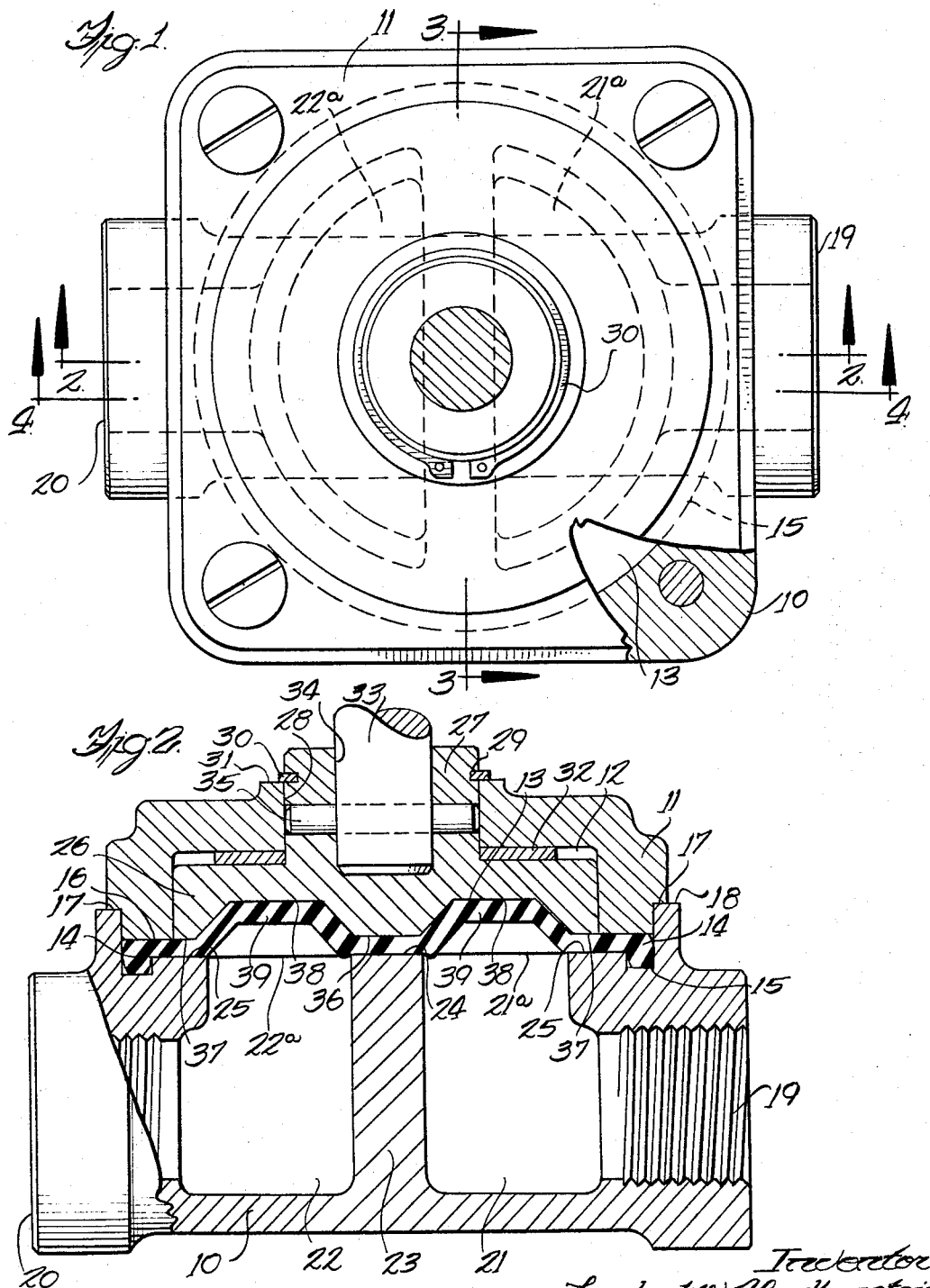
Inventors
Lambert W. Fleckenstein
Andrew J. Fleckenstein
Welsh and Bradway
Attorneys Oct. 18, 1966 L. W. FLECKENSTEIN ETAL 3,279,749
DIAPHRAGM VALVE
Filed Dec. 23, 1963 4 Sheets-Sheet 2
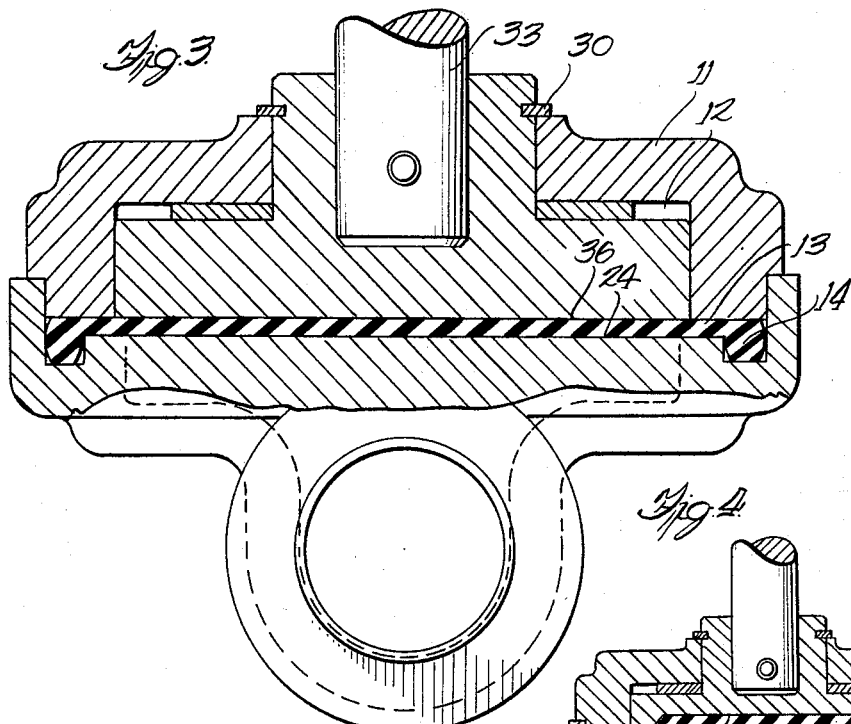
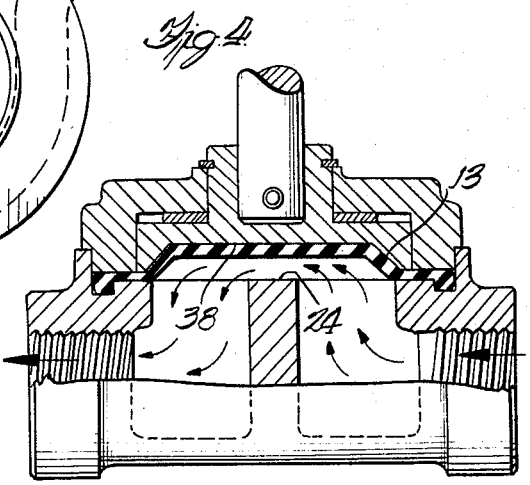
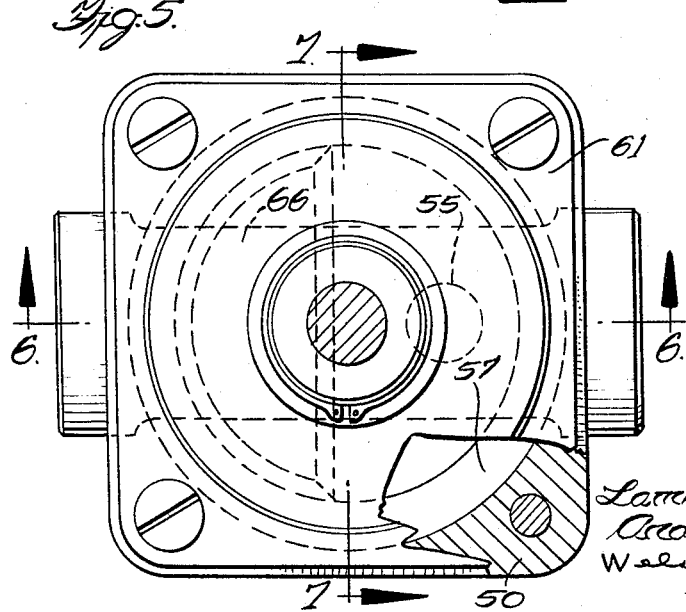
Inventors
Lambert W. Fleckenstein
Andrew J. Fleckenstein
Welch and Broadway
Attorneys Inventors
Lambert W. Fleckenstein
Andrew J. Fleckenstein
Welsh and Bradway
Attorneys

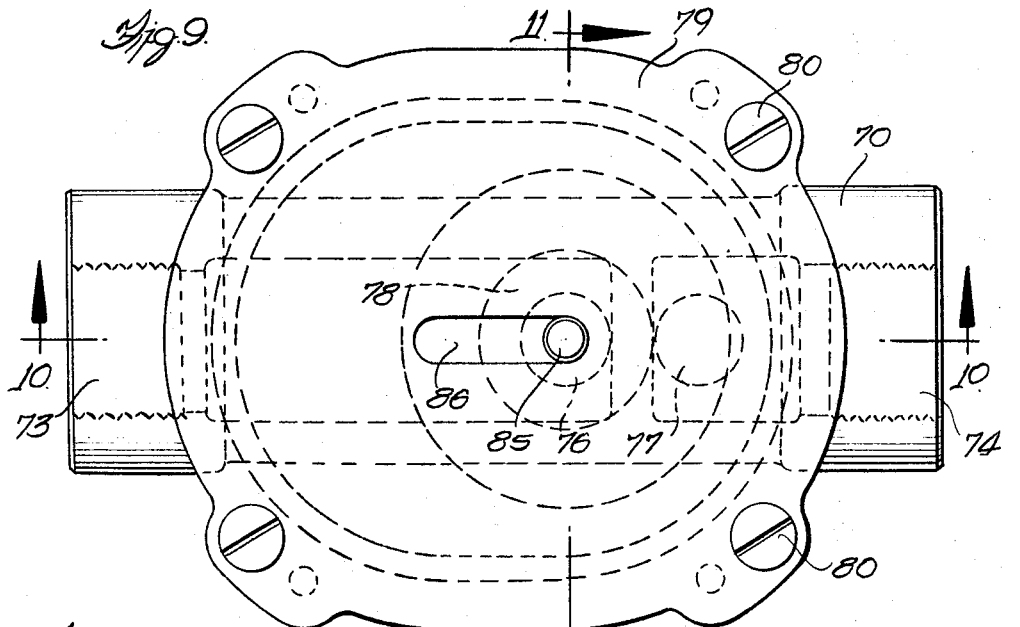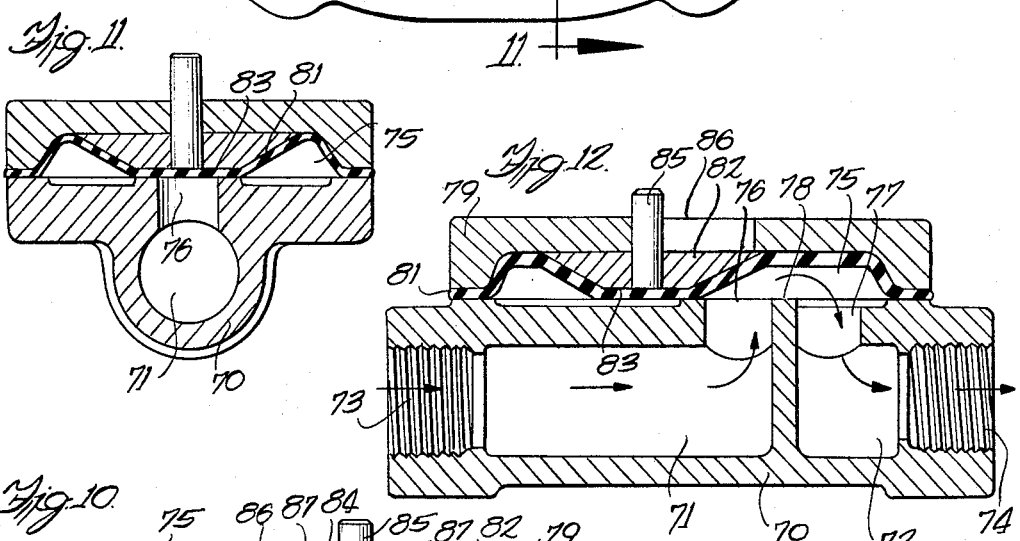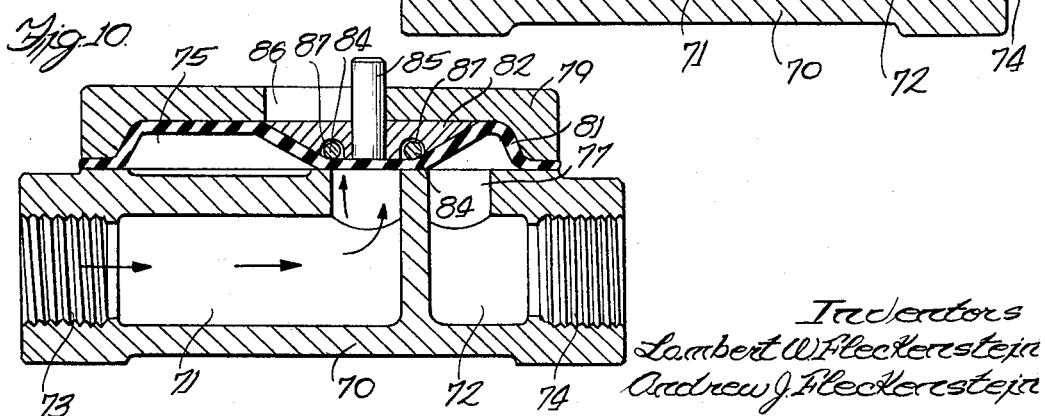

United States Patent Office 3,279,749
Patented Oct. 18, 1966

3,279,749
DIAPHRAGM VALVE
Lambert W. Fleckenstein, 4445 N. 135th, and Andrew J. Fleckenstein, 13650 Squirrel Drive, both of Brookfield, Wis.
Filed Dec. 23, 1963, Ser. No. 332,645
15 Claims. (Cl. 251—331)

This invention relates generally to valves for controlling the flow of fluid and, more particularly, to valves of the type having a flexible diaphragm which seals the operating parts of the valve from the fluid therein and which acts as the valve closure.

One object of this invention is to provide a diaphragm type of valve having operating parts which can be made from inexpensive materials and protected by the diaphragm and which is relatively compact.

Another object of this invention is to provide a valve which is so designed as to permit use of a relatively thin and inexpensive diaphragm for protecting operating parts of the valve.

Yet another object of this invention is to provide a diaphragm valve in which a member remains in backup, reinforcing relation to the diaphragm and which sweeps the diaphragm into sealing contact with a seat.

An additional object of this invention is to provide a diaphragm valve which requires only a small amount of operating force to open and close the valve.

Other objects and advantages of this invention will become apparent from the following specification taken in conjunction with the claims and drawings, in which:

FIGURE 1 is a plan view of a valve embodying this invention;

FIGURE 2 is a cross-sectional view taken along line 2—2 of FIGURE 1;

FIGURE 3 is an enlarged cross-sectional view taken along line 3—3 of FIGURE 1;

FIGURE 4 is a reduced cross-sectional view taken along line 4—4 of FIGURE 1 but showing the valve in an open position;

FIGURE 5 is a plan view of a valve showing a modified form of the invention;

FIGURE 9 is a plan view of a valve showing another modified form of the invention;

FIGURE 10 is a reduced cross-sectional view taken along line 10—10 of FIGURE 9;

FIGURE 11 is a reduced cross-sectional view taken along line 11—11 of FIGURE 9; and FIGURE 12 is a reduced cross-sectional view similar to that of FIGURE 10, but showing the valve in an open position.

Figure 6:
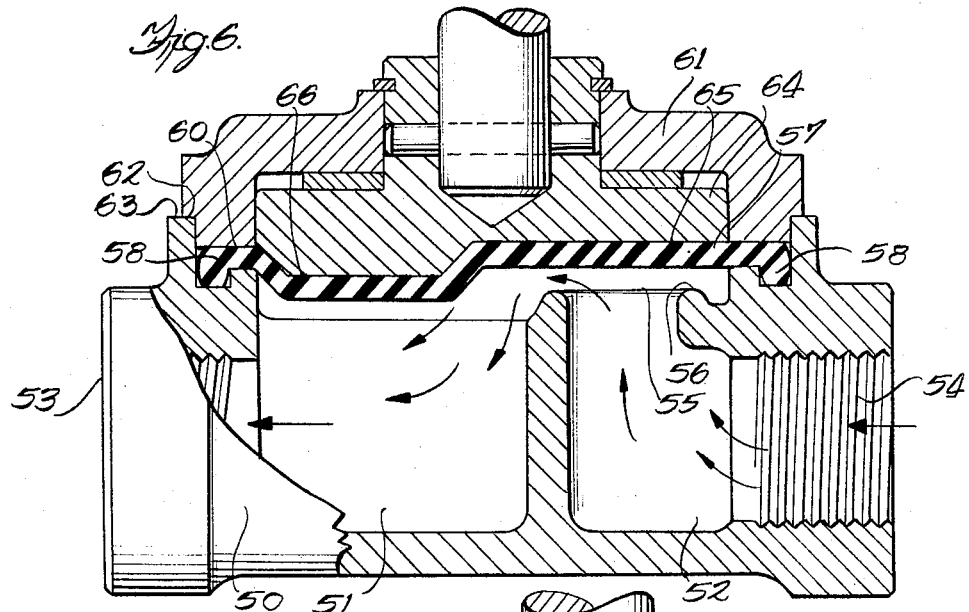
FIGURE 6 is an enlarged cross-sectional view taken along line 6—6 of FIGURE 5.
Figure 7:
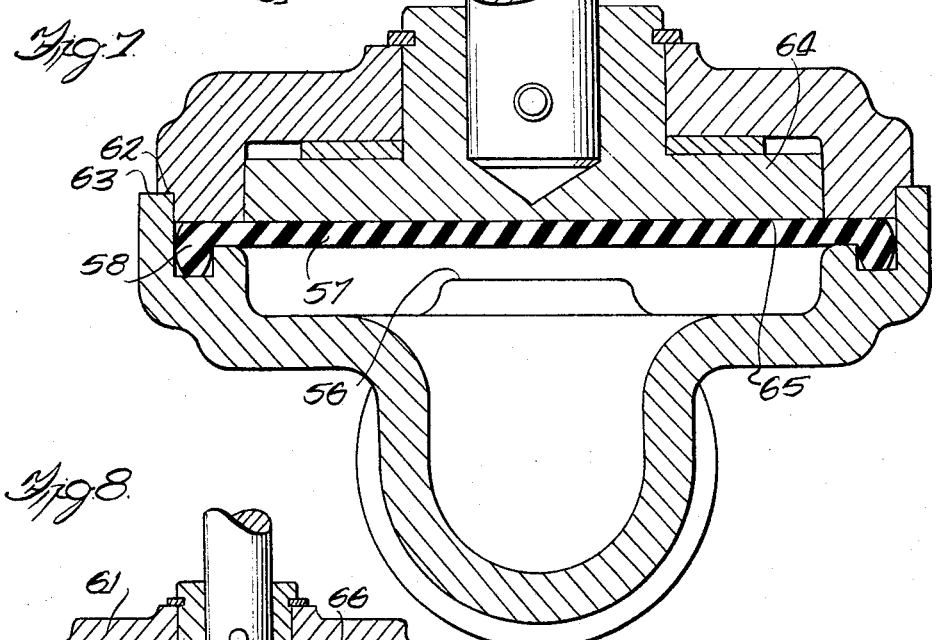
FIGURE 7 is an enlarged cross-sectional view taken along line 7—7 of FIGURE 5.
Figure 8:
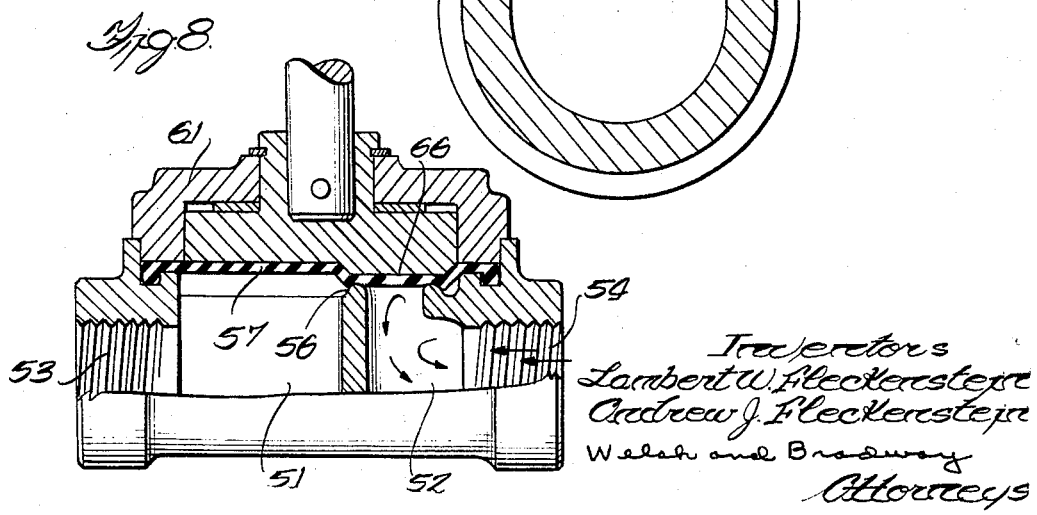
FIGURE 8 is a reduced cross-sectional view similar to that of FIGURE 6 but showing the valve in a closed position.

One form of the invention is shown in FIGURES 1 to 4 in which the valve has a body 10 and a bonnet 11 attached to the body by fasteners, such as screws, to form a chamber 12 extending across the top of the valve. A circular diaphragm 13 having a circumferential lip 14 is clamped between the body 10 and the bonnet 11 with the lip 14 fitting in an annular recess 15 in the body. Compression of the diaphragm by the bonnet is limited by the engagement of an overhanging rim 17 on the bonnet with a raised shoulder 18 of the body which transmits most of the weight of the bonnet to the body.

A threaded inlet 19 located at one end of the body is connected to an inlet passage 21 and a threaded outlet 20 located at the opposite end of the body is connected to an outlet passage 22. The passages are connected, respectively, by openings 21a and 22a to the chamber 12 and separated from each other by a partition 23 which extends across the body. A seating surface is formed around and between the openings 21a and 22a by the top surface 24 of the partition and the annular surface 25 of the body. The diaphragm 13 extends across the openings 21a and 22a and is held against the annular surface 25 surrounding the passages by the surfaces 16 of the bonnet 11. The natural resilience of the diaphragm flexes it away from the openings and the seating surface 24.

In order to flow through the valve body 10, liquid must pass through the openings 21a and 22a and over the top surface 24 of the valve body partition 23. This flow is controlled by the diaphragm 13 which can be pressed into sealing engagement with the top surface 24 of the valve body partition or allowed to retract from this surface in accordance with the movement of a rotary member or plate 26.

The plate is mounted in the bonnet 11 by means of a hub 27 which is journalled in an opening 28 in the bonnet. A portion of the hub extends beyond the top of the bonnet and has a circumferential groove 29 to receive a split supporting ring 30 which rests on a shoulder 31 at the top of the bonnet to support the rotatable plate in the bonnet and act as a thrust bearing for the plate. To facilitate turning of the plate relative to the bonnet, a flat ring bearing 32 fits between the plate and the bonnet at the base of the hub 27. The plate 26 is turned by a cylindrical shaft 33 which fits into a bore 34 in the hub 27 and which is fastened to the hub by a pin 35 extending through the hub and the shaft. The shaft 33 is connected at its opposite end to a handle or other means (not shown) which can rotate the shaft and the plate.

The diaphragm side of plate 26 is made up of surfaces spaced from the plane of the surfaces 24 and 25 by approximately the thickness of the diaphragm and a surface spaced a greater distance from this plane. This surface consists of an annular portion 37 and a portion 36 extending diametrically across the annular portion, both of which are spaced from said plane by a distance slightly less than the thickness of the diaphragm and surfaces 38 between surface 36 and annular surface 37, which surfaces 38 have a greater spacing from said plane. These projecting surfaces 36 and 37 have the same configuration as the seating surface surrounding and separating the openings 21a and 22a of the valve body. The annular portion 37 of this surface maintains the outer portion of the diaphragm 13 in contact with the annular surface 25 of the valve body. The diametrically extending portion 36 of this surface is movable into and out of alignment with the top surface 24 of the body partition 23 upon rotation of the plate. The surface portion 36 of the plate engages the diaphragm and presses a portion of it toward the plane of the seating surface and when this surface is aligned with the portion 24 of the seating surface, the diaphragm is pressed between these surfaces as well to close the valve.

The valve is opened by rotating the operating plate 26 in either direction from its closed position, as shown in FIGS. 1, 2 and 3 toward the position shown in FIGURE 4. When the plate is in this fully open position of FIGURE 4, the diametrically extending portion 36 of the projecting surface of the plate extends at right angles to the top surface 24 of the partition between the passages. The diaphragm 13, due to its resilience and the pressure of the fluid moves against the main surface 38 of the plate to form channels 39 extending across the top surface of the partition and connecting the openings 21a and 22a to allow fluid to flow from the inlet passage 21 to the outlet passage 22 of the valve.

During rotation of the plate, the annular portion 37 of the projecting surface of the plate simply turns on the outer edge of the diaphragm 13, while maintaining this edge in sealing contact with the annular seating surface 25 of the valve body. During rotation, the projecting surface 36 slides along the surface of the diaphragm and sweeps a portion of the diaphram into the plane of the seating surfaces. Due to its resilience, each portion of the diaphragm retracts from the plane of the seating surfaces as the diametric portion of the plate moves past. The axis of rotation of the plate is positioned so as to extend generally normal to the plane of the seating surface and the path of movement of the projecting surface lies in a plane which is parallel to the plane of the seating surface.

A modified form of the invention is shown in FIGURES 5 to 8 wherein a valve body 50 has outlet and inlet passages 51 and 52. Threaded fittings 53 and 54 are provided for the passages 51 and 52. The passages communicate with one another through a chamber above an opening 55 which opening extends through an annular seat 56. A generally flat, flexible diaphragm 57 is positioned in the chamber and above the seat 56. The diaphragm has a circumferentially extending lip 58 which is fitted in an annular slot 59 in the valve body 50 and is clamped against the body by a ring-shaped surface 60 of a bonnet 61. Compression of the diaphragm by the bonnet is limited by the engagement of an overhanging rim 62 on the bonnet with a raised shoulder 63 of the body.

An operating plate 64 is mounted above the diaphragm in a manner similar to the mounting of the plate 26 in the bonnet 11 of FIGURES 1 to 4 but differs in the shape and location of its projecting or wiping surface 66 which is positioned asymmetrically of the plate. As in FIGURES 1 to 4, this surface projects from the main face 65 of the plate to engage the diaphragm and stretch it toward the plane of the valve seating surface 56. The plane of the wiping surface is spaced from the plane of the seating surface a distance equal to slightly less than the thickness of the diaphragm so that the diaphragm will be compressed between these surfaces when they are aligned.

In this embodiment of the invention, the projecting surface 66 may be in the shape of a semicircle extending over less than one-half of the face of the plate. When the plate is rotated so that the projecting surface 66 is located diametrically opposite the annular seat 56, as shown in FIGURE 6, the valve is in the fully open position. The generally flat diaphragm 57 is held against the main surface 65 of the plate and away from the seat 56 by its own resilience and the pressure of the fluid so as to allow fluid to pass through the opening 55 to and from the passages 51 and 52. The valve can be closed by rotating the plate through an angle of 180° in either direction from the position shown in FIGURE 6 to the position shown in FIGURE 8. During rotation of the plate, the projecting surface 66 stretches the diaphragm 57 into the plane of the seating surface 56 and into contact with the seating surface as the projecting surface slides across the surface of the diaphragm and moves into alignment with the seat. When the projecting surface is aligned with the seating surface, the diaphragm is compressed between these surfaces to seal the opening 55 and prevent fluid from flowing from one passage to the other. Rotation of the projecting surface out of alignment with the seating surface allows the portion of the diaphragm over the seating surface to move away from this surface to permit flow of fluid through opening 55.

The axis of rotation of the plate is generally normal to the plane of the seating surface and the path of movement of the projecting surface is in a plane which is parallel to the plane of the seating surface. With this arrangement, the projecting surface slides across the diaphragm to press it into sealing contact with the seating surface and allow it to flex away from the seating surface.

Another form of the invention is shown in FIGURES 9 to 12 wherein a valve body has a first passage 71 with a threaded inlet 73 and a second passage 72 with a threaded outlet 74. The passages are connected by openings 76 and 77 to a chamber 75, opening 76 leading to the main passage 71 and opening 77 leading to the second passage 72. A valve seating surface 78 is formed around the opening 76. The chamber 75 is enclosed by a bonnet 79 which is attached to the valve body 70 by threaded fasteners 80. A flexible diaphragm 81 is positioned in the chamber to extend across the opening 76 and is formed so as to normally be spaced away from the opening 76 and the valve seat 78. The diaphragm is held in place by the clamping action of the bonnet 79 and the valve body 70.

An operating plate 82 is mounted in the chamber 75 on the side of the diaphragm 81 opposite to the valve seat side for sliding movement. The plate has a projecting surface 83 which engages the diaphragm 81 and presses it toward the plane of the valve seat. A stem 85 which is attached to the top of the plate, extends through an elongated slot 86 in the bonnet 79 to provide a means for moving the plate. The stem and slot cooperate to guide and limit the movement of the plate from the open to the closed position of the valve.

In the closed position of the valve, shown in FIGURE 10, the plate 82 and its projecting surface 83 are positioned over the opening 76 with the stem contacting one end of the slot 86. The projecting surface 83 presses the diaphragm 81 into contact with the seating surface 78 to prevent flow through the passages 71 and 72 and the chamber 75. The valve is opened by moving the stem and plate to the position shown in FIGURE 12 in which the stem contacts the opposite end of the slot 86 and the projecting surface 83 is moved away from the opening 76. With the projecting surface moved away from the seating surface, the diaphragm 81 flexes away from the valve seat and liquid can flow through the valve.

During the movement of the plate from the open to closed position, the projecting surface 83 slides across the surface of the diaphragm 81 and wipes the diaphragm into sealing engagement with the seating surface 78. As in the previously described constructions, the path of movement of the projecting surface is in a plane which is parallel to the plane of the seating surface and the projecting surface 83 is spaced above the seating surface a distance slightly less than the thickness of the diaphragm so that the alignment of the projecting surface with the seating surface will compresss the diaphragm between these surfaces for a tight fitting shut off.

Rollers 84 may be carried by the projection of the valve operating disc so that the roller rolls across the surface of the diaphragm, while the remainder of the disc slides across this surface of the diaphragm. Such a roller or rollers may be received within a recesss 87 in the projection and positioned so that the surface of the roller or rollers projects slightly beyond the diaphragm contacting side of the projection. A plurality of spaced rollers may be carried by the projection so that in the closed position of the valve, the rollers are opposed to the valve seat; thus, firmly holding the diaphragm against the valve seat in the closed position of the valve.

In each form of the invention, the operating and moving parts of the valve are fully shielded from the fluid within the valve by the diaphragm, thus permitting use of inexpensive materials for the moving parts of the valve. The diaphragms are tightly and stationarily clamped at their peripheral margins to effect a fluid-tight seal. In each form, the operating plate backs up and reinforces the diaphragm, thus permitting use of lightweight and relatively thin diaphragms of rubber or rubber-like materials.

By using motion of the operating member in planes generally parallel to the plane of the valve seat, as distinguished from motion in directions normal to the plane of the valve seat, as is found in conventional diaphragm valves, the operating chamber and the overall valve can be small and compact.

The sliding or wiping action of the operating members on the diaphragms, which produces a progressive wavelike motion of portions of the diaphragms in directions parallel to the plane of the valve seat during opening and closing movement of the valve, requires small operating forces. Frictional resistance to this motion may be reduced by a film of lubricant between the operating member and the diaphragm.

The principles of the invention may be utilized with flexible diaphragms that are essentially flat, in which case pressure of the fluid flowing through the valve forces the diaphragm toward a position where it is flush against substantially all of the operating member. The diaphragms may be molded to have the configurations illustrated so as to approximately match the configurations illustrated, so as to enhance the flexing action with movement of the operating member.

Whereas we have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

We claim:

1. A valve including a valve body having a chamber connected by openings to an inlet and an outlet, a valve seating surface surrounding one of said openings, a flexible diaphragm extending across said seating surface and adapted to close the same, said diaphragm being movable away from the seating surface to allow flow of fluid through said opening, a movable member positioned adjacent to the diaphragm on the side thereof opposite to the seating surface side of said diaphragm, said member having a flat surface projecting toward the plane of the seating surface, said projecting surface being in sliding engagement with said opposite side and slidable in a plane parallel with the plane of the seating surface across the diaphragm to engage and move a portion of the diaphragm into sealing contact with the seating surface to stop the flow of fluid through said opening, and means interconnected with said member to slide said projecting surface toward and away from said flow stopping position.

2. A valve including a valve body having passages adapted to communicate with one another through a valve seat, a diaphragm-type closure surface positioned over said valve seat, said diaphragm being capable of flexing movement toward and away from said seat, and an operting member positioned adjacent to said diaphragm on the opposite surface thereof from said valve seat and being mounted in said valve body for movement in a direction parallel to but spaced from the general plane of said valve seat, said member being in sliding engagement with said opposite surface, said member having a projecting portion with a flat surface movable therewith and formed and adapted to move to and from positions holding said diaphragm snugly against said seat.

3. A valve including a valve body having passages adapted to communicate with one another through a valve seat, a diaphragm positioned over said valve seat, said diaphragm being capable of flexing movement toward and away from said seat, and an operating member positioned adjacent to said diaphragm on the other side thereof from said valve seat and being movably mounted in said valve body to slide across the surface of said diaphragm, said member having a flat projecting surface movable in a plane generally parallel to the plane of said seat but spaced therefrom by an amount slightly less than the thickness of said diaphragm, said surface being movable to and from positions over said seat whereby said diaphragm may flex away from said valve seat when said surface is moved away from a position over said seat.

4. In a valve of the type having a diaphragm positioned in an operating chamber and provided with a valve seat engaging surface for closing against a valve seat and from flexing away therefrom to allow flow through said valve, the improvement comprising a member movable in a plane generally parallel to the plane of said seat and from a position over said valve seat, said member having a flat surface for holding said diaphragm against said seat, and means for causing sliding movement of said member so as to selectively open and close said valve through flexing movement of the diaphragm.

5. A valve including a valve body having a chamber, openings leading into said chamber, one opening leading to said chamber through a valve seat, a flexible diaphragm extending across said seat, said diaphragm being movable away from contact with said seat to permit fluid to flow between the openings and said chamber, a member movably mounted in said chamber on the opposite side of the diaphragm from the seating surface, said diaphragm sealing said member from said chamber, and having its marginal portions fixed with respect to said body, said member having a flat surface projecting toward the plane of said seat sufficiently to engage the surface of the diaphragm and press the diaphragm into fluid sealing contact with said seat when said projecting surface is aligned with said seat, said projecting surface being slidable in a plane parallel with the plane of said seat across the surface of the diaphragm toward and away from said position of alignment while producing a wavelike flexing motion of said diaphragm, and means for sliding said member and projecting surface of the member toward and away from said position of alignment.

6. A valve of the type described in claim 5 in which said member is rotatably mounted in said body, and said projecting surface slides across the diaphragm into and out of position in which it is aligned with said seat as the member is rotated.

7. A valve of the type described in claim 5 in which said member is circular, said projecting surface of said member extends diametrically across said member and said seat extends through the axis of rotation of said member and between said openings.

8. A valve of the type described in claim 5 wherein said member is mounted for rectilinear motion in said body.

9. A valve of the type described in claim 5 wherein said member is rotatably mounted about a central axis of said chamber, said projecting surface is located at one side of said axis, and said seat is located at one side of said axis.

10. A valve including a body having a chamber connected by openings to an inlet and outlet, a seating surface surrounding one of said openings, a flexible diaphragm extending across said opening and said seating surface and movable away from the seating surface to allow flow through the opening, a plate rotatably mounted with respect to the valve body and positioned on the opposite side of the diaphragm from the seating surface, said plate having a surface projecting toward the plane of the seating surface and engageable with the diaphragm to urge a portion of the diaphragm into said plane, rotation of the plate sliding said projecting surface across the diaphragm in a plane normal to the axis of rotation of the plate and into and out of alignment with the seating surface, said projecting surface pressing a portion of said diaphragm into sealing contact with said seating surface to close said opening upon alignment of the surfaces, and means interconnected with the plate to rotate the projecting surface of the plate into and out of alignment with the seating surface.

11. A valve including a body having a chamber connected by openings to an inlet and to an outlet, a seating surface surrounding one of said openings, a flexible diaphragm extending across said one opening and said seating surface and movable away from the seating surface to allow flow through the opening, a plate rotatably mounted with respect to the valve body and positioned on the opposite side of the diaphragm from the seating surface, said plate having a surface projecting toward the plane of the seating surface and engageable with the diaphragm to urge a portion of the diaphragm into said plane, rotation of the plate sliding said projecting surface across the diaphragm in a plane normal to the axis of the valve seat and into and out of alignment with the valve seat, said projecting surface pressing a portion of said diaphragm into sealing contact with said surface to close said opening upon alignment of the surfaces, and means interconnected with the plate to rotate the projecting surface of the plate into and out of alignment with the seating surface.

12. A valve including a valve body having a chamber connected by openings to an inlet and an outlet, a seating surface surrounding one of said openings, a flexible diaphragm extending across said seating surface and said opening and adapted to close the same, said diaphragm being movable away from the seating surface to allow flow of fluid through said opening, a member positioned adjacent to the diaphragm on the opposite side of the diaphragm from the seating surface, said member having a flat surface projecting toward the plane of the seating surface, said projecting surface being slidable across the diaphragm in a plane extending over the seating surface to engage and move a portion of the diaphragm into sealing contact with the seating surface to stop the flow of fluid through said opening, and means for sliding said member and said projecting surface toward and away from said flow stopping position.

13. A valve including a valve body having a chamber connected by openings to an inlet and an outlet, a seating surface surrounding one of said openings, a flexible diaphragm extending across said seating surface and said opening and adapted to close the same, said diaphragm spanning said chamber and having its marginal portions fixed to said body in fluid-tight relation so as to close said chamber, said diaphragm being movable away from the seating surface to allow flow of fluid through said opening, a member movably mounted in said body and adjacent to the diaphragm on the opposite side of the diaphragm from the seating surface, said member having a projecting flat surface movable in a plane generally parallel to the seating surface and spaced from the seating surface a distance no greater than the thickness of said diaphragm, said surface being movable across said opposite side of the diaphragm to cause a wavelike motion in said diaphragm and engage and move a portion of the diaphragm into sealing contact with the seating surface to stop the flow of fluid through said opening, and means for moving said member to cause movement of said surface toward and away from said flow-stopping position.

14. A valve including a valve body having valve passages therein, said passages being adapted for communication with one another through a chamber in said body, one of said passages opening into said chamber through a valve seat, a movable operating member positioned in said chamber and a flexible closure member positioned between said operating member and said valve seat, said closure member being positioned in said chamber so as to seal said operating member from fluid passing through said valve seat and into the chamber, said operating member having a projecting portion with a flat surface movable in a plane parallel to the plane of said valve seat with at least one roller carried on said flat surface, said surface and said roller being positioned against said flexible member, said roller being in rolling contact with said flexible member and being positioned so as to move with said operating member from one position over said valve seat and holding said flexible member in closed position on said seat to other positions spaced from said seat, said roller remaining in rolling contact with said flexible member during such movement while allowing flexing of said flexible member away from said valve seat to allow communication between said passages when moved to said positions.

15. In a valve including a valve body having passages adapted to communicate with one another through a valve seat, a diaphragm positioned over said valve seat, said diaphragm being capable of flexing movement toward and away from said seat, a plate positioned for rotation in said valve body with a face thereof adjacent to said diaphragm on the opposite side thereof from said valve seat, the face of said plate having a seating surface projecting outwardly therefrom in a direction toward the plane of said valve seat, said projecting surface being in sliding engagement with the opposite surface of said diaphragm in a plane parallel to the plane of said valve seat so that rotation of said plate moves said seating surface to and from positions holding said diaphragm snugly against said seat.

References Cited by the Examiner
UNITED STATES PATENTS

| 1,605,765 | 11/1926 | Papin | 251—331 X |
| 2,948,504 | 8/1960 | Merrill | 251—331 X |
| 2,989,076 | 6/1961 | Rohmann. | |

M. CARY NELSON, *Primary Examiner.*

A. ROSENTHAL, *Assistant Examiner.*